United States Patent
Mogi et al.

(10) Patent No.: US 6,822,271 B2
(45) Date of Patent: *Nov. 23, 2004

(54) SEMICONDUCTOR PHOTODETECTOR AND OPTICAL TRANSMITTING DEVICE

(75) Inventors: Toshiyuki Mogi, Yokohama (JP); Kazumi Kawamoto, Yokohama (JP); Shinji Tsuji, Hidaka (JP); Hitoshi Nakamura, Hachioji (JP); Masato Shishikura, Hachioji (JP); Satoru Kikuchi, Saku (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/485,852
(22) PCT Filed: Aug. 2, 1998
(86) PCT No.: PCT/JP98/03791
  § 371 (c)(1),
  (2), (4) Date: Feb. 17, 2000
(87) PCT Pub. No.: WO99/12216
  PCT Pub. Date: Mar. 11, 1999

(65) Prior Publication Data
  US 2003/0094667 A1 May 22, 2003

(30) Foreign Application Priority Data
  Aug. 28, 1997 (JP) .............................................. 9-232328

(51) Int. Cl.[7] .............................................. H01L 29/80
(52) U.S. Cl. .......................... 257/184; 257/189; 372/36
(58) Field of Search ................................ 257/431–466, 257/184, 189; 372/36

(56) References Cited

U.S. PATENT DOCUMENTS

| | | | | |
|---|---|---|---|---|
| 5,023,686 A | * | 6/1991 | Helmut et al. | 357/30 |
| 5,107,319 A | * | 4/1992 | Lauterbach et al. | 357/30 |
| 5,127,072 A | * | 6/1992 | Blauvelt et al. | 385/88 |
| 5,362,976 A | * | 11/1994 | Suzuki | 257/81 |
| 5,608,456 A | * | 3/1997 | Tokuda | 348/340 |
| 5,611,006 A | * | 3/1997 | Tabuchi | 385/14 |
| 5,621,837 A | * | 4/1997 | Yamada et al. | 385/88 |

FOREIGN PATENT DOCUMENTS

| | | | | |
|---|---|---|---|---|
| JP | 02094573 | * | 5/1990 | |
| JP | 02183185 | * | 7/1993 | |
| JP | 05183185 A | * | 7/1993 | H01L/31/10 |

* cited by examiner

Primary Examiner—Paul E Brock, II
(74) Attorney, Agent, or Firm—Antonelli, Terry, Stout & Kraus, LLP

(57) ABSTRACT

In aiming at cost lowering of an optical module and an optical transmission apparatus and with the objective of providing a semiconductor light receiving element that has a good coherence with the other edge emitting/incidence type optical devices and is capable of performing the positioning easily and with a high accuracy, in the edge emitting/incidence type light receiving element in which the light absorbing layer 19 has been formed, the space region is formed so as to provide at least 100 $\mu m^2$ of the marker detecting region 24, thereby facilitating detection of marker 23 on the optical device 26 and executing the positioning of the light receiving element with a high accuracy, the space region resulting from eliminating a part of the light absorbing layer 19 that absorbs the detection light of the light receiving element, the transmission amount of the detection light toward the marker detecting region that is parallel to a primary plane being equal to 30% or higher, the detection light having penetrated and transmitted the primary plane of the light receiving element.

18 Claims, 6 Drawing Sheets

SEMICONDUCTOR PHOTODETECTOR AND OPTICAL TRANSMITTING DEVICE

TECHNICAL FIELD

The present invention relates to a semiconductor light receiving element and an optical transmission device that are used in fields such as an optical communications field.

BACKGROUND ART

In recent years, in order to expand and enhance the information service network, the cost lowering has been desired in the optical communications field also. The key to constructing a low cost optical communications system is cost lowering of an optical module for converting an optical signal to an electrical signal and the electrical signal to the optical signal. This requires an optical device that can be integrated on the same substrate by a simple implementing system.

Optical devices, typically a semiconductor laser diode, a light modulator, an optical switch and so on, generally have an edge emitting/incidence type structure and thus receives and emits light in a direction parallel to the substrate surface. On the other hand, semiconductor light receiving elements are generally of surface light receiving type or surface illuminated type that receive a light signal from a direction perpendicular to the substrate surface plane. Accordingly, since surface light receiving type semiconductor light receiving elements differ from other optical devices in the receiving and emitting direction of the light, they are poor in terms of coherence with other devices from viewpoint of integration.

On the other hand, there has been conventionally known an edge emitting/incidence type semiconductor light receiving element that has been disclosed in, for example, JP-A-64-90570 and has a good coherence with other optical devices. However, in the edge emitting/incidence type semiconductor light receiving elements, due to the structure thereof, the positional relationship between an emitting position of the light from an optical device and a light receiving surface of the semiconductor light receiving element depends on a sensitivity of the light receiving element exceedingly. On account of this, in the passive type alignment, means is said to be required that allows a position of the edge emitting/incidence type semiconductor light receiving element to be measured on the optical devices with a high accuracy.

In the above-described prior art, when the edge emitting/incidence type semiconductor light receiving element is mounted on an optical device, markers are formed on the optical device side of the light receiving element and at the optical device part. Then, using light that is capable of transmitting through the both, i.e., for example, light with a wavelength of around 1.3 μm, positions of the respective markers are detected, thereby executing the positioning of the edge emitting/incidence type semiconductor light receiving element on the optical device.

However, in the case of light receiving elements for receiving light of about 1.3 to 1.6 μm that are frequently used in fields such as the optical communications, the transmitted light with the wavelength of around 1.3 μm is absorbed at the light receiving layer. This makes it difficult to detect the positions of the markers that serve as a guide for positioning.

An object of the present invention is to provide a semiconductor light receiving element that facilitates the positioning thereof at the time when the semiconductor light receiving element having an absorbing layer of an arbitrary wavelength is mounted on an optical device, and a fabricating method thereof.

Also, another object of the present invention is to provide a low cost optical module or an optical transmission device on which the above-described semiconductor light receiving element according to the present invention is mounted as a signal receiving element or as a monitoring element of semiconductor laser light.

DISCLOSURE OF THE INVENTION

In order to accomplish the above-identified objects, an optical element according to the present invention includes a light absorbing layer and is to be mounted on a specific position of a certain member by positioning it to the specific position by irradiating the element with light having a wavelength range at least a part of which may be absorbed by the light absorbing layer and detecting a transmitted light, wherein a region which does not include the light absorbing layer and which has a higher transmission rate for the irradiation light than the remaining region so as to be identifiable in terms of its position is provided within a 2-dimensional projected region of the optical element projected onto a plane which is generally parallel to a plane on which the optical element is to be mounted.

Also, in order to accomplish the above-described objects, a light receiving element according to the present invention includes a light absorbing layer and is to be mounted on a substrate which in turn includes another optical device, wherein a part of the light absorbing layer facing a portion of at least the substrate out of the substrate and light receiving element which functions as a positioning marker is removed.

Figure 1:
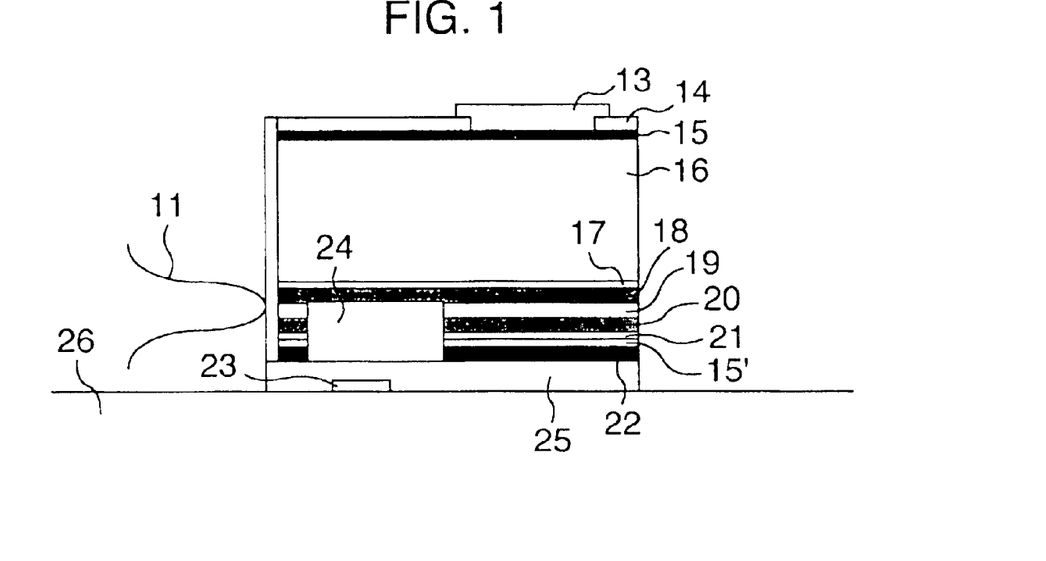
FIG. 1 is a cross sectional view of an edge emitting/incidence type light receiving element according to an embodiment 1 of the present invention.

More concretely, as illustrated in, for example, FIG. 1, an edge emitting/incidence type semiconductor light receiving element is provided that has a light absorbing layer 19 sandwiched between an upper 2nd core layer 18 and a lower 2nd core layer 20 and between an upper clad layer 17 and a lower clad layer 21, wherein the edge emitting/incidence type semiconductor light receiving element has a marker detecting space region (a positioning region) 24 for measuring a positioning marker 23 on an optical device on which the edge emitting/incidence type semiconductor light receiving element is mounted. Here, a portion in FIG. 1 at which a signal light 11 and the light absorbing layer 19 are in contact with each other is a light receiving region of the edge emitting/incidence type semiconductor light receiving element.

Figure 4:
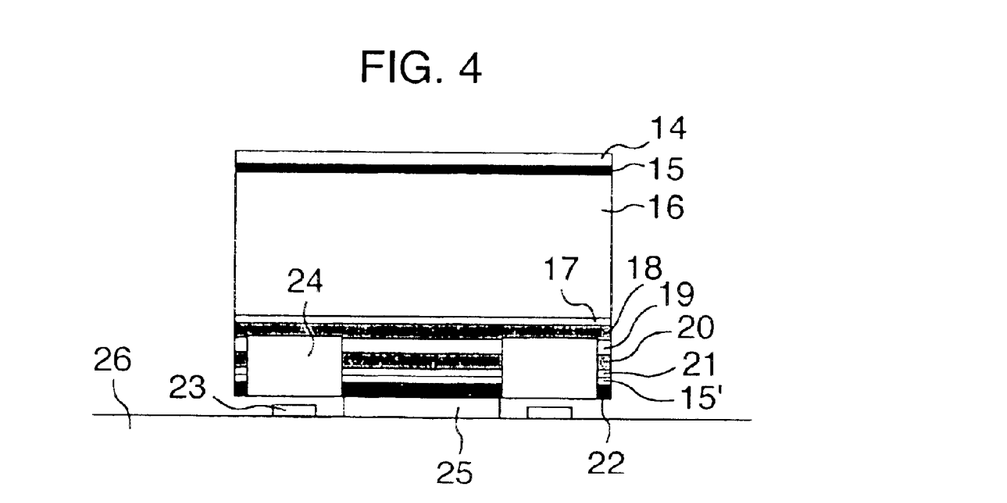
FIG. 4 is a cross sectional view of the edge emitting/incidence type light receiving element according to the embodiment 1 of the present invention.

In the above-described edge emitting/incidence type light receiving element according to the present invention, as illustrated in, for example, FIG. 4, when the light absorbing layer 19 is formed, the crystal layers are selectively grown using a mask or the like so that a light absorbing layer 19 in the light receiving region remains present and a portion of the light absorbing layer 19 facing the positioning marker 23 on the optical device is vacated (not formed), thereby forming the space region 24 for detecting the marker 23. The light transmission rate of the illumination light (hereinafter, referred to as detection light), which is radiated and transmits through the marker detecting space region 24 so as to detect the positioning marker 23, is configured to exceed, for example, 30% of the detection light with which the edge emitting/incidence type light receiving element is irradiated.

According to the above-described edge emitting/incidence type light receiving element of the present invention, attenuation due to the light absorbing layer 19 of the positioning detection light radiated from below is extremely small as compared with the case where the light absorbing layer 19 remains present. This makes it easier to observe the marker 23 through the light receiving element, despite that the marker 23 on the optical device is shadowed by the edge emitting/incidence type light receiving element, thereby enhancing the production efficiency.

Figure 7:
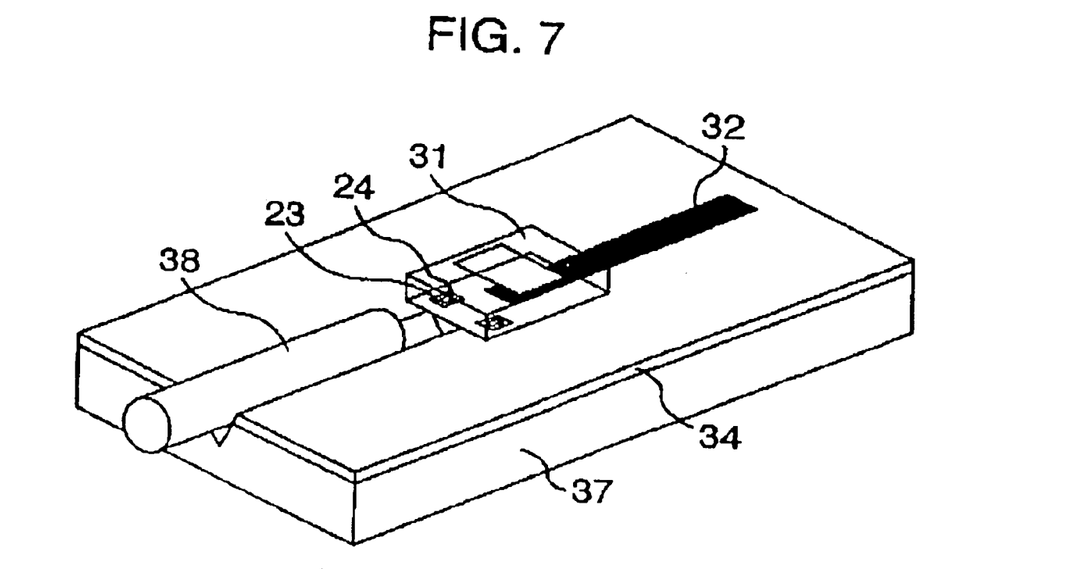
FIG. 7 is a perspective view for illustrating an entire structure of an embodiment 2 according to the present invention.
Figure 8:
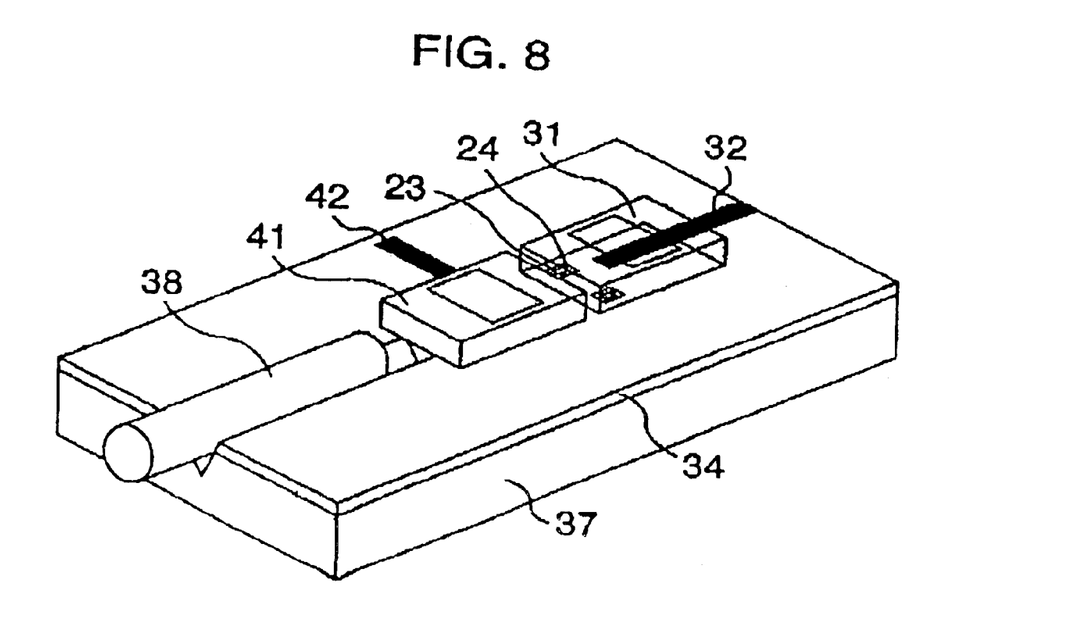
FIG. 8 is a perspective view for illustrating an entire structure of an embodiment 3 according to the present invention.

Also, according to the above-described edge emitting/incidence type light receiving element of the present invention, since mounting accuracy on an optical module substrate 26 is also enhanced, the light receiving efficiency is enhanced as well. By virtue of this, the edge emitting/incidence type light receiving element according to the invention may be configured such that an edge emitting/incidence type light receiving element 31 according to the invention is integrated on a substrate 37 having a V shaped groove for securing an optical fiber 38, without optical lenses, so as to be used as a signal receiving element or as a monitoring element for a semiconductor laser diode 41, as shown in FIGS. 7 and 8.

Figure 9:
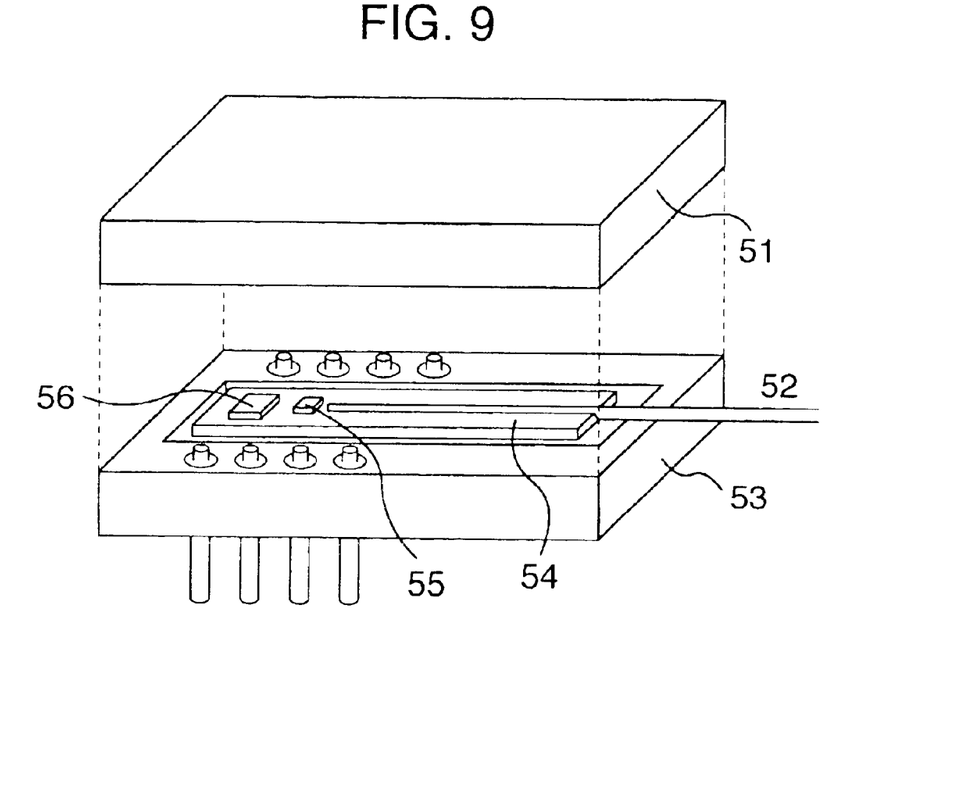
FIG. 9 is a perspective view for illustrating an entire structure of an embodiment 4 according to the present invention.

Also, as shown in FIG. 9, by using a passive alignment method, a signal-receiving edge emitting/incidence type light receiving element 55 according to the present invention may be integrated on a V-shaped groove substrate 54 having an optical fiber 52 for an incident light signal. Moreover, a preamplifier IC 56 may also be mounted and, in addition, they may be packaged with a base 53 and a cap 51 made of ceramic or resin. Instead of using the base 53 and the cap 51, a resin transfer molding may be employed.

Also, an edge emitting/incidence type light receiving element according to the invention may be used in a light sending module in which the light receiving element is used for monitoring a semiconductor laser or edge emitting/incidence type light receiving elements according to the invention may be used in a light sending/receiving module in which one of the elements used for reception and the other used for monitoring a semiconductor laser are respectively mounted on a same substrate.

Figure 10:
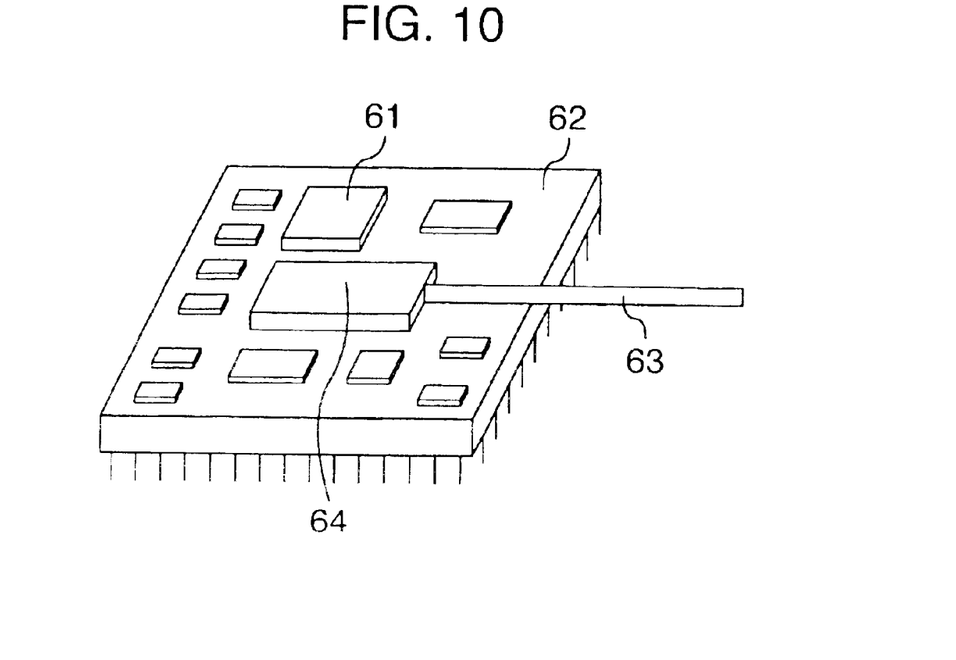
FIG. 10 is a perspective view for illustrating an entire structure of an embodiment 5 according to the present invention.

Furthermore, as illustrated in FIG. 10, an optical module 64 in which an edge emitting/incidence type light receiving element according to the present invention is mounted and is equipped with an optical fiber 63, and an electronic circuit such as a signal-receiving IC 61, may be mounted on the same board 62 so as be used as a sending, a receiving, or a sending/receiving apparatus in an optical transmission system.

Also, in order to accomplish the above-described objects, a method of fabricating an edge emitting/incidence type semiconductor light receiving element according to the invention comprises the steps of sequentially laminating a plurality of different thin film layers including a light absorbing layer on a substrate, wherein steps of laminating the light absorbing layer and subsequent layers include either prohibiting thin films involved from growing at a predetermined region so as to allow the semiconductor light receiving element to be adapted to be positioned in place or an etching step to remove a portion of the light absorbing layer present under a predetermined region so as to allow the semiconductor light receiving element to be adapted to be positioned in place.

BEST MODE FOR CARRYING OUT THE INVENTION

Referring to the drawings, the explanation will be given below concerning embodiments of a light receiving element according to the present invention and an apparatus including the light receiving element.

Embodiment 1

FIG. 1 illustrates a cross sectional structure of an embodiment according to the present invention in which an InGaAlAs series compound semiconductor is used.

Using a molecular beam epitaxy (MBE) method, the basic structure of a semiconductor light receiving element according to the present embodiment is formed by sequentially laminating on a p-InP substrate 16 the n-InAlAs upper clad layer 17 in a thickness of 1.0 $\mu$m, the n-InGaAlAs upper 2nd core layer 18 in a thickness of 1.5 $\mu$m, the undoped InGaAlAs light absorbing layer 19 in a thickness of 1.5 $\mu$m, the p-InGaAlAs lower 2nd core layer 20 in a thickness of 1.5 $\mu$m, the p-InAlAs lower clad layer 21 in a thickness of 0.5 $\mu$m, and a n-InGaAs contact layer 15' in a thickness of 0.2 $\mu$m.

Moreover, the semiconductor light receiving element according to the present embodiment includes a p type electrode 22 provided adjacent to the n-InGaAs contact layer 15', a solder layer 25 for connection with an optical device 26 on which the semiconductor element is to be mounted, a contact layer 15 laminated over the p-InP substrate 16 as viewed on the present drawing, a SiN insulating film 14, and a n type electrode 13.

Here, the undoped InGaAlAs light absorbing layer 19 absorbs the detection light which has the wavelength of around 1.3 $\mu$m and is radiated from below in FIG. 1 at the time of, for example, positioning and is transmitted through the p-InP substrate 16 so as to detect the marker formed on the lower side of the semiconductor light receiving element.

To cope with such, in the present embodiment, in order to make it possible to detect the marker 23 on the side of the optical module substrate 26 on which the semiconductor light receiving element is mounted, a mask or the like is used at the time of forming the undoped InGaAlAs light absorbing layer 19, the p-InGaAlAs lower 2nd core layer 20 and the p-InAlAs lower clad layer 21 so as to perform crystal growth in a manner in which the space region (the positioning region) 24 from which the undoped InGaAlAs light absorbing layer 19 is excluded may be formed so as to be able to detect the marker 23 on the side of the substrate. Alternatively, the respective layers in the above-explained structure can be removed by etching or the like process after they are laminated, resulting in a formation of a similar structure.

Namely, there is absolutely no necessity of adding a new process in order to form the space region (hereinafter, referred to as a marker detecting region) from which the undoped InGaAlAs light absorbing layer 19 has been excluded in order to make it possible to detect the positioning marker, which is the characteristic structural feature of the present invention. It is just enough to make a slight modification such as changing the shape of the mask so that the marker detecting region of concern may be formed in the process carried out conventionally.

The size of the marker detecting region 24 is determined, depending on mounting accuracy needed and resolution of an image pickup apparatus used for detecting the marker 23. For example, supposing that the mounting accuracy required for the semiconductor light receiving element relative to the signal light 11 is equal to ±1 $\mu$m, the measurement accuracy of at least ±0.1 $\mu$m becomes necessary. As the marker detecting region 24 that allows the accuracy to be ensured, a region having a side of 10 $\mu$m or longer (100 $\mu m^2$) becomes necessary when the measurement of the boundary surface or the center of gravity of the marker 23 is executed so as to accomplish the predetermined accuracy by using a camera with the resolution of 1 $\mu$m.

Also, in the case where the semiconductor light receiving element has metallized layers 13, 25 which do not transmit the detection light therethrough, it becomes necessary to secure a region of 100 $\mu m^2$ or larger which is not shadowed when the marker detecting region 24 is observed from above.

Figure 2:
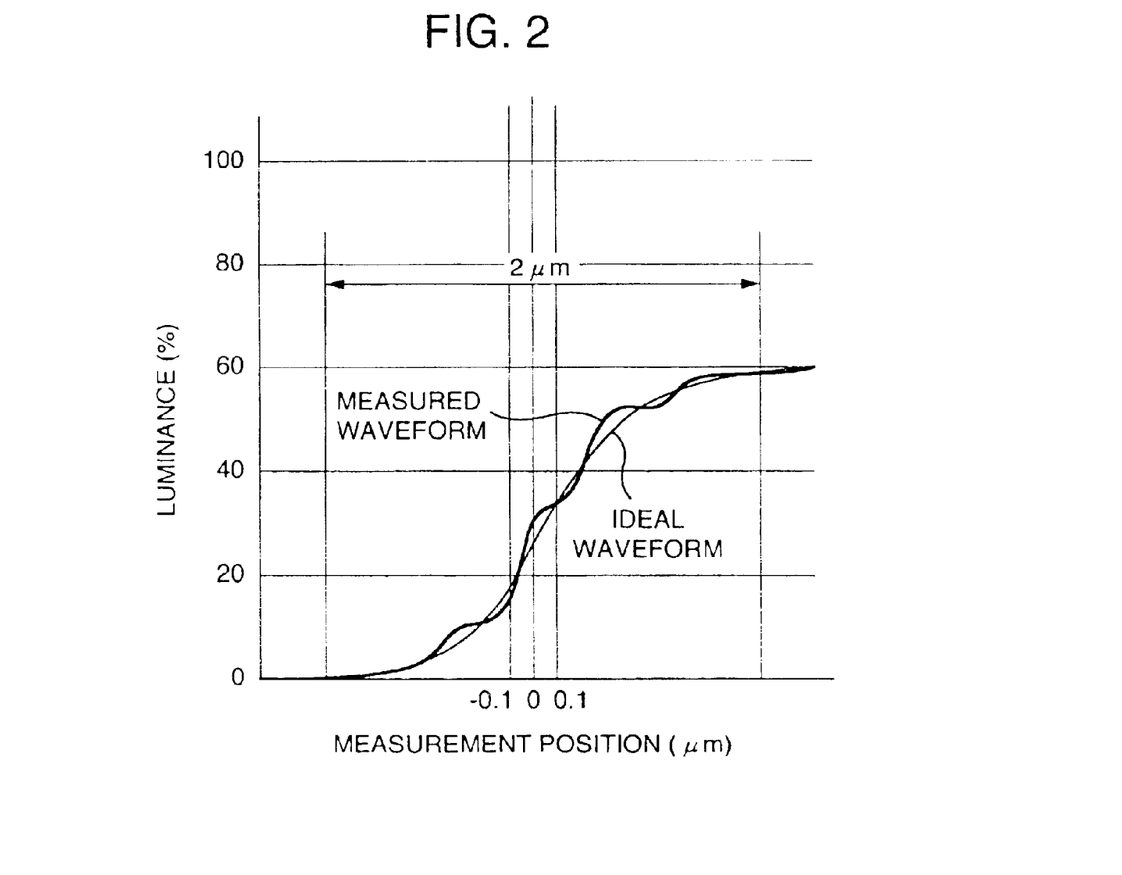
FIG. 2 is a luminance distribution diagram of the edge emitting/incidence type light receiving element according to the embodiment 1 of the present invention.

The marker 23 is measured based on a difference between an amount of light transmitting through the non-transmitting portion at the edge thereof and an amount of light transmitting through the transmitting portion at the edge thereof when the detection light is irradiated at the time of positioning. However, the transmitting portion does not permit all of the incident light to pass through but attenuates a part thereof. Here, assuming that a value of the contrast at the time when all of the incident light passes through is equal to 100%, the luminance distribution in the case of the contrast of 30% is as illustrated in FIG. 2.

By the way, in order to identify an edge of light and dark portions of an optical image obtained by the detection light, it is necessary to take into consideration an inclination (which depends on the contrast) of the luminance distribution in the proximity of the edge and noise in the luminance. For instance, in a camera for measuring near-infrared radiation or neighbor thereof, which is frequently used in positioning purpose in technical fields to which the present invention is applied, noise occurring in the image signal is about 5%. On account of this, unless the luminance distribution has an inclination greater than that within a measurement accuracy to be aimed at, it is impossible to satisfy the accuracy required.

Figure 3:
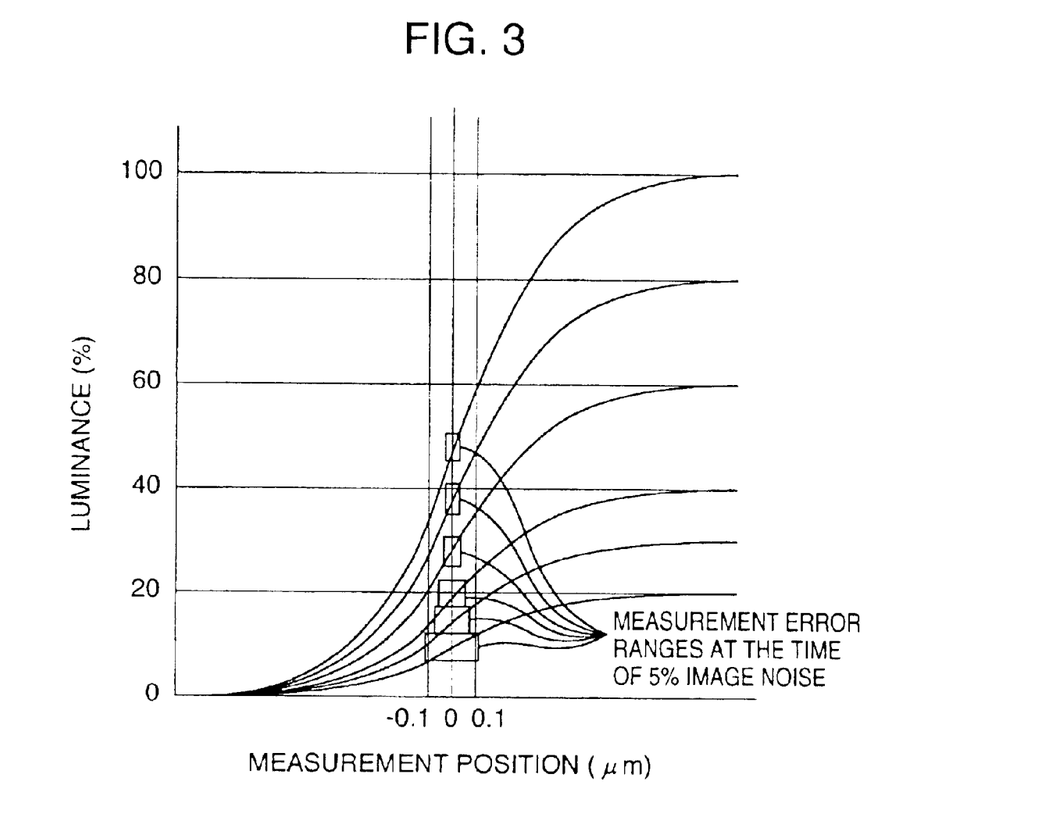
FIG. 3 is a luminance distribution diagram of the edge emitting/incidence type light receiving element according to the embodiment 1 of the present invention.

In a graph where the position is taken as a transverse axis and the luminance is taken as a longitudinal axis, plotting the luminance distributions in the case where the contrast is made to change from 20% to 100% results in distributions as illustrated in FIG. 3. Assuming that the measurement accuracy needed for positioning is equal to ±0.1 $\mu$m, from these luminance distributions, the contrast needed in the present embodiment becomes equal to 30% or more.

FIG. 4 illustrates an example of the cross sectional structure taken perpendicularly to the signal light 11 that includes the marker detecting region 24 in FIG. 1. In the present example, there are formed the marker detecting regions 24 at two locations, namely, at the right and the left with respect to an optical axis of the signal light 11 (refer to FIG. 1) incoming from the edge of the semiconductor light receiving element. This is because the case with only one marker detecting region 24 makes it difficult to detect an angle within a horizontal plane of the semiconductor light receiving element. As indicated in the present example, forming two or more marker detecting regions 24 within the semiconductor light receiving element makes it easy to detect the angle within the horizontal plane.

Figure 5:
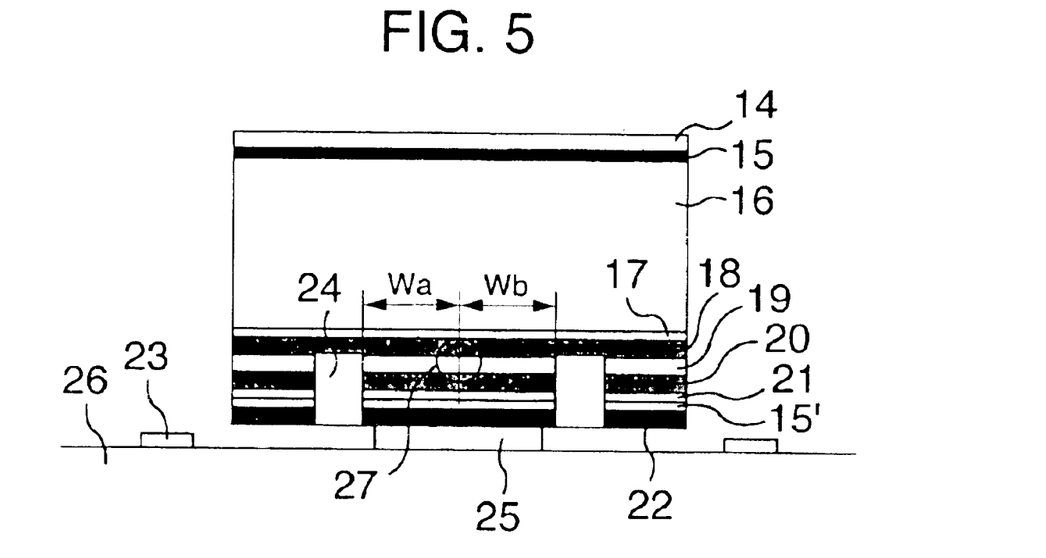
FIG. 5 is a cross sectional view of the edge emitting/incidence type light receiving element according to the embodiment 1 of the present invention.

FIG. 5 illustrates another structure example of the semiconductor light receiving element utilizing the present embodiment. FIG. 5 is a cross sectional view taken perpendicularly to the incoming signal light.

In the present example, while relatively ensuring accuracies Wa, Wb with reference to a light receiving region 27, space regions themselves in which the light absorbing layer 19 has been eliminated are utilized as the positioning markers on the side of the semiconductor light receiving element. Usually, Wa, Wb are set to be identical in length. The reason why the two lengths Wa, Wb are used is to absorb an error such as an expansion of the size of the marker itself attributed to an optical aberration at the time of the measurement or a difference in diffraction of light at the time of the light exposure, which are likely to happen when the marker is provided at one location only and an attempt is made to perform positioning in accordance with only the distance from the marker.

Utilizing the relative accuracies Wa, Wb as in the case of the present example, the marker detecting regions 24 are formed at two locations and boundary regions between the light absorbing layers 19 and the marker detecting regions 24 are detected, making it possible to measure the position of the semiconductor light receiving element with a high accuracy.

Figure 6:
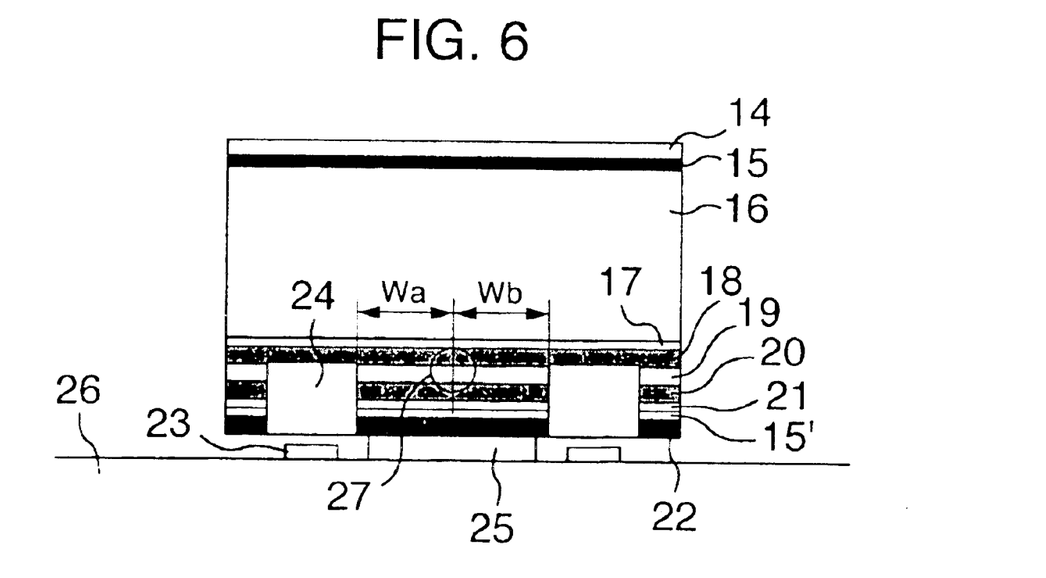
FIG. 6 is a cross sectional view of the edge emitting/incidence type light receiving element according to the embodiment 1 of the present invention.

Also, as illustrated in FIG. 6, markers 23 on the optical module substrate 26 may be formed so that, when the positioning is performed, they may be each positioned within the marker detecting regions 24 illustrated in FIG. 5 the relative accuracies of which have been secured. With the configuration like the present example, it becomes possible to observe both the marker detecting regions 24 and the markers 23 simultaneously and with a high accuracy, thus allowing the mounting with a high position accuracy.

Figure 11:
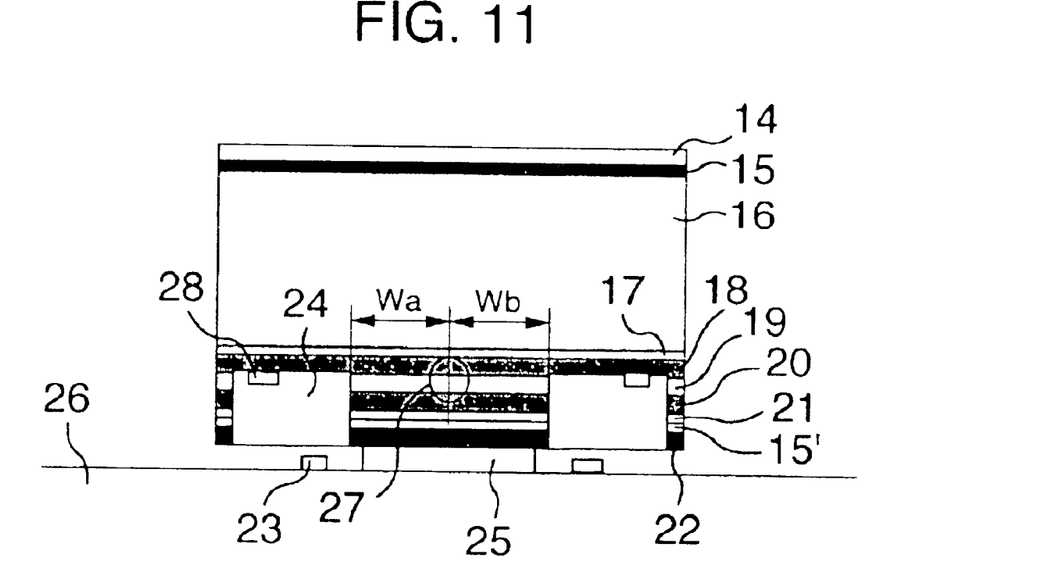
FIG. 11 is a cross sectional view of the edge emitting/incidence type light receiving element according to the embodiment 1 of the present invention.

Also, as illustrated in FIG. 11, the following configuration is possible: Light receiving element-side markers 28 are each provided within a respective one of a pair of marker detecting regions 24 formed in the semiconductor light receiving element. Then, positioning is performed so that each of the light receiving element-side markers 28 and a substrate-side marker 23 corresponding thereto may satisfy a predetermined relative position relationship.

Embodiment 2

FIG. 7 illustrates a structure of an embodiment of an optical module in which the edge emitting/incidence type light receiving element according to the present invention is employed.

In the present embodiment, using a passive alignment method, an edge emitting/incidence type light receiving element 31 of the present invention is flip-chip mounted on a V-shaped groove substrate 37 having an insulating film 34 and an electrical wiring 32. Here, the edge emitting/incidence type light receiving element 31 used is an element that has a n type electrode on one surface and a p type electrode on the opposite side. For the connection of the edge emitting/incidence type light receiving element 31 with the electrical wiring 32, AuSn solder has been used.

Moreover, in the present embodiment, at two locations on the right and the left sides of the light receiving surface of the edge emitting/incidence type light receiving element 31, there are provided marker detecting regions 24 formed by vacating the light absorbing layer 19. In addition, a pair of markers 23 are provided on the V-shaped groove substrate 37 so that they are each positioned within the respective regions of these marker detecting regions 24, when the edge emitting/incidence type light receiving element 31 is positioned.

These configurations bring about a structure that makes it possible to measure positions of the edge emitting/incidence type light receiving element 31 and the V-shaped groove substrate 37 with a high accuracy, and to accomplish the positioning of the both with a high precision.

According to the present embodiment, detection accuracies of the both fall within ±0.1 $\mu$m, and thus mounting accuracy has been suppressed down to within ±1.0 $\mu$m. Also, as a light reception sensitivity of the semiconductor light receiving element 31 for the light of 1.3 $\mu$m, a higher value of 0.85 A/W has been obtained.

Embodiment 3

FIG. 8 illustrates a structure of another embodiment of an optical module in which the edge emitting/incidence type light receiving element according to the present invention is employed.

In the present embodiment, using the passive alignment method, the semiconductor laser 41 and the edge emitting/incidence type light receiving element 31 of the present invention are flip-chip mounted on the V-shaped groove substrate 37 having the insulating film 34, an electrical wiring 32 for a monitoring light receiving element and an electrical wiring 42 for the semiconductor laser. Here, the edge emitting/incidence type light receiving element 31 used is an element that has a n type electrode on one surface and a p type electrode on the opposite side. For the connection of the edge emitting/incidence type light receiving element 31 with the electrical wiring 32, AuSn solder has been used.

Moreover, in the present embodiment, at two locations i.e., on the right and the left sides of the light receiving surface of the edge emitting/incidence type light receiving element 31, there are provided the marker detecting regions 24 formed by vacating the light absorbing layer 19. In addition, the pair of markers 23 are provided on the V-shaped groove substrate 37 so that they may be each positioned within the respective regions of these marker detecting regions 24, when the edge emitting/incidence type light receiving element 31 is positioned.

These configurations bring about a structure that makes it possible to measure positions of the edge emitting/incidence type light receiving element 31 and the V-shaped groove substrate 37 with a high accuracy, and to accomplish the positioning of the both with a high precision. After that, the optical fiber 38 with a flat end has been fixed to the V-shaped groove.

According to the present embodiment, position deviations at the time of mounting the respective elements and at the time of fixing the optical fiber have been suppressed down to within ±1 $\mu$m. Thus, an optical coupling loss between the semiconductor laser 41 and the monitoring edge emitting/incidence type light receiving element 31 has been found to be 2 to 3 dB. Also, as a monitoring current at the time of the outside output of 1 mW, a satisfactory value of 400 $\mu$A has been obtained.

Embodiment 4

FIG. 9 illustrates a structure of an embodiment of a packaged light receiving module in which the edge emitting/incidence type light receiving element in the present invention is employed.

In the present embodiment, using a passive alignment method, the signal-receiving edge emitting/incidence type light receiving element 55 of the present invention is mounted on the V-shaped groove substrate 54. Furthermore, in order to heighten the sensitivity, the signal-receiving preamplifier IC 56 has been also mounted on the V-shaped groove substrate 54. After that, an optical fiber 52 for signal light incidence is placed and is fixed to the base 53 formed of ceramic, then being lidded by the cap 51.

The transmission of an optical module fabricated according to the present embodiment was evaluated and has shown that, in a burst transmission with a signal light wavelength of 1.3 $\mu$m and a transmission rate of 50 Mb/s, the minimum light reception sensitivity at an error ratio of the minus eighth power of 10 has been found to be −38 dBm, which is quite satisfactory.

Incidentally, instead of the base 53 and the cap 51 formed of ceramic, the ones formed of resin, or a resin transfer molding may be employed. Further, a sending and a sending/receiving optical module that uses an edge emitting/incidence type light receiving element according to the present invention may be packaged.

Embodiment 5

FIG. 10 illustrates an embodiment of an optical transmission apparatus in which an edge emitting/incidence type light receiving element according to the present invention is employed.

In the present embodiment, mounted on the board 62 are the light receiving module 64 in which an edge emitting/incidence type light receiving element according to the present invention is mounted and is equipped with the signal light-incoming optical fiber 63, and the signal-receiving IC 61 and the other electronic components.

The transmission of the optical transmission apparatus fabricated according to the present embodiment was evaluated. In a burst transmission with a signal light wavelength of 1.3 $\mu$m and a transmission rate of 50 Mb/s, the minimum light reception sensitivity in an error ratio of the minus eighth power of 10 was found to be −38 dBm, which is quite satisfactory.

Incidentally, instead of the above-described light receiving module, a light sending module and a light sending/receiving module in which an edge emitting/incidence type light receiving element according to the present invention may be integrated.

Industrial Usability

According to the present invention, it becomes possible to perform the positioning of edge emitting/incidence type semiconductor light receiving elements onto an optical device with a high accuracy, thus allowing a high optical coupling to be easily embodied without using an optical lens. Accordingly, by taking advantage of edge emitting/incidence type semiconductor light receiving elements according to the present invention, it becomes possible to fabricate a low cost optical module and a low cost optical transmission apparatus without undergoing complicated mounting processes.

What is claimed is:

1. A light transmitting module comprising:
a substrate;
an optical fiber disposed on one surface of said substrate; and
an edge emitting/incidence type light receiving element having a layer disposed on said one surface of said substrate;
wherein said layer of said edge emitting/incidence type light receiving element includes a light absorbing portion and another portion which is a non-light absorbing portion and which defines a space region of said layer, said non-light absorbing portion being of a size sufficient to enable a predetermined mounting accuracy with a predetermined measuring accuracy achievable when said substrate is measured with a camera.

2. A light transmitting module according to claim 1, wherein said light absorbing portion of said layer at least partially surrounds said another portion of said layer which is said non-light absorbing portion and which defines said space region of said layer.

3. A light transmitting module according to claim 1, wherein said edge emitting/incidence type light receiving element is positioned on said one surface of said substrate by projecting a light having a wavelength which is absorbed by said light absorbing portion of said layer and which is enabled to pass said another portion of said layer which is said non-light absorbing portion.

4. A light transmitting module according to claim 1, wherein said edge emitting/incidence type light receiving element is a semiconductor light receiving element.

5. A light transmitting module according to claim 4, wherein said optical fiber is optically coupled to said semiconductor light receiving element.

6. A light transmitting module according to claim 4, further comprising a semiconductor laser mounted on said substrate, said semiconductor light receiving element being optically coupled to at least one of said semiconductor laser and said optical fiber.

7. A light transmitting module according to claim 5, wherein said semiconductor light receiving element disposed on said substrate is configured by being packaged with either ceramic or resin.

8. A light transmitting module according to claim 6, wherein said semiconductor light receiving element disposed on said substrate is configured by being packaged with either ceramic or resin.

9. A light transmitting module according to claim 1, wherein at least a part of said light absorbing portion and at least a part of said non-light absorbing portion lie in substantially a same plane.

10. A light transmitting module comprising:
a substrate;
an optical fiber disposed on one surface of said substrate;
an edge emitting/incidence type light receiving element having a layer disposed on said one surface of said substrate; and
a marker disposed on said one surface of said substrate;
wherein said layer of said edge emitting/incidence type light receiving element includes a light absorbing portion and another portion which is a non-light absorbing portion and which defines a space region of said layer, said non-light absorbing portion enabling observation of said marker therethrough.

11. A light transmitting module according to claim 10, wherein said light absorbing portion of said layer at least partially surrounds said another portion of said layer which is said non-light absorbing portion and which defines said space region of said layer.

12. A light transmitting module according to claim 10, wherein said edge emitting/incidence type light receiving element is positioned on said one surface of said substrate by projecting a light having a wavelength which is absorbed by said light absorbing portion of said layer and which is enabled to pass said another portion of said layer which is said non-light absorbing portion.

13. A light transmitting module according to claim 10, wherein said edge emitting/incidence type light receiving element is a semiconductor light receiving element.

14. A light transmitting module according to claim 13, wherein said optical fiber is optically coupled to said semiconductor light receiving element.

15. A light transmitting module according to claim 13, further comprising a semiconductor laser mounted on said substrate, said semiconductor light receiving element being optically coupled to at least one of said semiconductor laser and said optical fiber.

16. A light transmitting module according to claim 14, wherein said semiconductor light receiving element disposed on said substrate is configured by being packaged with either ceramic or resin.

17. A light transmitting module according to claim 15, wherein said semiconductor light receiving element disposed on said substrate is configured by being packaged with either ceramic or resin.

18. A light transmitting module according to claim 10, wherein at least a part of said light absorbing portion and at least a part of said non-light absorbing portion lie in substantially a same plane.

* * * * *